United States Patent
Channabasavaiah et al.

(10) Patent No.: US 8,595,288 B2
(45) Date of Patent: Nov. 26, 2013

(54) ENABLING SOA GOVERNANCE USING A SERVICE LIFECYCLE APPROACH

(75) Inventors: Kishore Channabasavaiah, Palatine, IL (US); Benjamin S. Gerber, Ann Arbor, MI (US); Sri Ramanathan, Lutz, FL (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 12/410,503

(22) Filed: Mar. 25, 2009

(65) Prior Publication Data
US 2010/0250320 A1 Sep. 30, 2010

(51) Int. Cl.
G06F 15/16 (2006.01)

(52) U.S. Cl.
USPC ......... 709/203; 705/7.13; 705/7.15; 709/204; 709/226; 718/1; 718/101; 717/104

(58) Field of Classification Search
None
See application file for complete search history.

(56) References Cited

U.S. PATENT DOCUMENTS

| | | | |
|---|---|---|---|
| 6,738,736 B1 * | 5/2004 | Bond | 703/2 |
| 6,915,282 B1 * | 7/2005 | Conway et al. | 706/12 |
| 7,315,826 B1 * | 1/2008 | Guheen et al. | 705/7.29 |
| 7,630,965 B1 * | 12/2009 | Erickson et al. | 1/1 |
| 7,801,976 B2 * | 9/2010 | Hodges et al. | 709/223 |
| 7,885,793 B2 * | 2/2011 | Padmanabhan | 703/2 |
| 7,996,347 B2 * | 8/2011 | Hutson et al. | 706/45 |
| 2002/0078046 A1 * | 6/2002 | Uluakar et al. | 707/8 |
| 2002/0128810 A1 * | 9/2002 | Craig et al. | 703/17 |
| 2003/0086373 A1 * | 5/2003 | Kronz | 370/235 |
| 2004/0010772 A1 * | 1/2004 | McKenna et al. | 717/101 |
| 2004/0093381 A1 * | 5/2004 | Hodges et al. | 709/204 |
| 2004/0243458 A1 * | 12/2004 | Barkan | 705/9 |

(Continued)

FOREIGN PATENT DOCUMENTS

WO 2005048066 5/2005

OTHER PUBLICATIONS

Schepers et al. "A lifecycle approach to SOA governance" (2008) SAC '08 Proceedings of the 2008 ACM symposium on Applied computing.*

(Continued)

*Primary Examiner* — Gurkanwaljit Singh
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices are provided for creating and using shared services through service-oriented architecture governance and a services lifecycle process. Service lifecycle steps are identified within a service-oriented architecture shared services model. Service stakeholders, decision-making touch-points and service state transition touch-points are identified in the shared services model, and service state-based lifecycle governance checkpoints within the shared services model are defined as a function of the identified service lifecycle steps, service stakeholders, decision-making touch-points and state transition touch-points. Further, integration points to existing processes are defined as a function of defined service state-based lifecycle governance checkpoints, governance fit-gap analysis are performed as a function of defined service state-based lifecycle governance checkpoints and identified service stakeholders, and services lifecycle gap touch-points are implemented as a function of the governance fit-gap analysis.

18 Claims, 5 Drawing Sheets

(56) References Cited

U.S. PATENT DOCUMENTS

| | | | |
|---|---|---|---|
| 2005/0114829 A1* | 5/2005 | Robin et al. | 717/101 |
| 2005/0119905 A1* | 6/2005 | Wong et al. | 705/1 |
| 2005/0222885 A1* | 10/2005 | Chen et al. | 705/8 |
| 2005/0223109 A1* | 10/2005 | Mamou et al. | 709/232 |
| 2005/0234969 A1* | 10/2005 | Mamou et al. | 707/102 |
| 2005/0240354 A1* | 10/2005 | Mamou et al. | 702/19 |
| 2005/0262191 A1* | 11/2005 | Mamou et al. | 709/203 |
| 2005/0262192 A1* | 11/2005 | Mamou et al. | 709/203 |
| 2006/0010195 A1* | 1/2006 | Mamou et al. | 709/203 |
| 2006/0053124 A1* | 3/2006 | Nishio et al. | 707/100 |
| 2006/0059028 A1* | 3/2006 | Eder | 705/7 |
| 2006/0111921 A1* | 5/2006 | Chang et al. | 705/1 |
| 2007/0245013 A1* | 10/2007 | Saraswathy et al. | 709/223 |
| 2008/0022257 A1 | 1/2008 | Baartman et al. | |
| 2008/0127047 A1 | 5/2008 | Zhang et al. | |
| 2008/0163207 A1* | 7/2008 | Reumann et al. | 718/1 |
| 2008/0172263 A1* | 7/2008 | Heyman | 705/7 |
| 2008/0256238 A1* | 10/2008 | Hu et al. | 709/226 |
| 2008/0263194 A1 | 10/2008 | Choi et al. | |
| 2008/0285481 A1 | 11/2008 | Hao et al. | |
| 2008/0294408 A1* | 11/2008 | Padmanabhan | 703/13 |
| 2008/0312979 A1* | 12/2008 | Lee et al. | 705/7 |
| 2008/0312980 A1* | 12/2008 | Boulineau et al. | 705/7 |
| 2010/0161371 A1* | 6/2010 | Cantor et al. | 705/9 |

OTHER PUBLICATIONS

"A new service-oriented architecture (SOA) maturity model" (2005) Sonic Software Corporation et al.*

"Building SOA Solutions and Managing the Service Lifecycle" (May-Sep. 2007); Presented by IBM developerWorks.*

Blake, M.. (2007). Decomposing Composition: Service-Oriented Software Engineers. IEEE Software, 24(6), 68.*

Varadan, R., Channabasavaiah, K., Simpson, S., Holley, K., & Allam, A.. (2008). Increasing business flexibility and SOA adoption through effective SOA governance. IBM Systems Journal, 47(3), 473-488.*

* cited by examiner

ENABLING SOA GOVERNANCE USING A SERVICE LIFECYCLE APPROACH

FIELD OF THE INVENTION

The present invention generally describes methods, systems and devices for providing guidance for the creation and use of shared services through service-oriented architecture governance and services lifecycle processes.

BACKGROUND OF THE INVENTION

Changing business needs over time may result in the creation of complex, inflexible application architectures, often with high levels of redundancy of business functions and data. To ensure that business needs drive information technology (IT) solutions, Many organizations desire to break down application "silos", wherein the deployment of multiple IT systems such as enterprise resource planning (ERP), customer relationship management (CRM), data warehouses, customer portals and content management systems results in incomplete and inconsistent pictures of corporate information and project or group-specific business functions. More particularly, it is desired to increase focus on building IT integration capabilities to develop and deploy shareable and reusable services that may be used across lines of business and across processes in a manner dictated by business needs and not by the application or information technology (IT) architecture.

Organizations are increasingly turning to service-oriented architecture (SOA) methods, systems and models to develop and deploy shareable and reusable services, and adopting SOA models requires an effective SOA governance process. Governance is the underlying foundation of organizational transformation and managing an enterprise around its various initiatives. A well-defined governance model that enables a transformation defines the outcome of the initiatives undertaken by the enterprise. The defined governance model impacts the processes and entities that come under the purview of the transformation and, in addition, may impact others that play no role in the immediate transformation.

Existing IT governance processes are not focused on sharing or deploying solutions across lines of business, rather current IT governance processes are narrowly focused on the deployment of specific IT solutions. Additionally, existing governance processes are not concerned with the lifecycle of a solution, but are concerned with an initial deployment within a specific business area. In an SOA environment, the goal of an SOA governance process is to promote sharing of services across lines of business and the services lifecycle management is a critical element of the governance function to ensure that business processes don't break as updates or new versions of services are made available. However, current SOA Governance models are deficient in managing service orientation aspects of business to IT strategies, and insufficient for the adoption of service orientation through SOA across an entire enterprise.

SUMMARY OF THE INVENTION

Methods are provided for creating and using shared services through service-oriented architecture governance and a services lifecycle process. Service lifecycle steps are identified within a service-oriented architecture shared services model including programmable devices. Service stakeholders, decision-making touch-points and service state transition touch-points are identified in the shared services model, and service state-based lifecycle governance checkpoints within the shared services model are defined as a function of the identified service lifecycle steps, service stakeholders, decision-making touch-points and state transition touch-points. Methods also further include defining integration points to existing processes within the shared services model as a function of defined service state-based lifecycle governance checkpoints; performing a governance fit-gap analysis of the shared services model as a function of defined service state-based lifecycle governance checkpoints and identified service stakeholders; and implementing services lifecycle gap touch-points within the shared services model as a function of the governance fit-gap analysis.

Service methods are also provided comprising deploying applications for creating and using shared services through service-oriented architecture governance and a services lifecycle process according to the method steps described above, for example by a service provider who offers to implement or deploy computerized implementations and/or perform functions for others. Still further, articles of manufacture comprising a computer usable medium having a computer readable program in said medium are provided. Such program code comprises instructions which, when executed on a computer system, cause the computer system to perform one or more method and/or process elements described above for creating and using shared services through service-oriented architecture governance and a services lifecycle process. Moreover, systems, articles and programmable devices are also provided, configured for performing one or more method and/or process elements of the current invention for creating and using shared services through service-oriented architecture governance and a services lifecycle process, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

Figure 1:
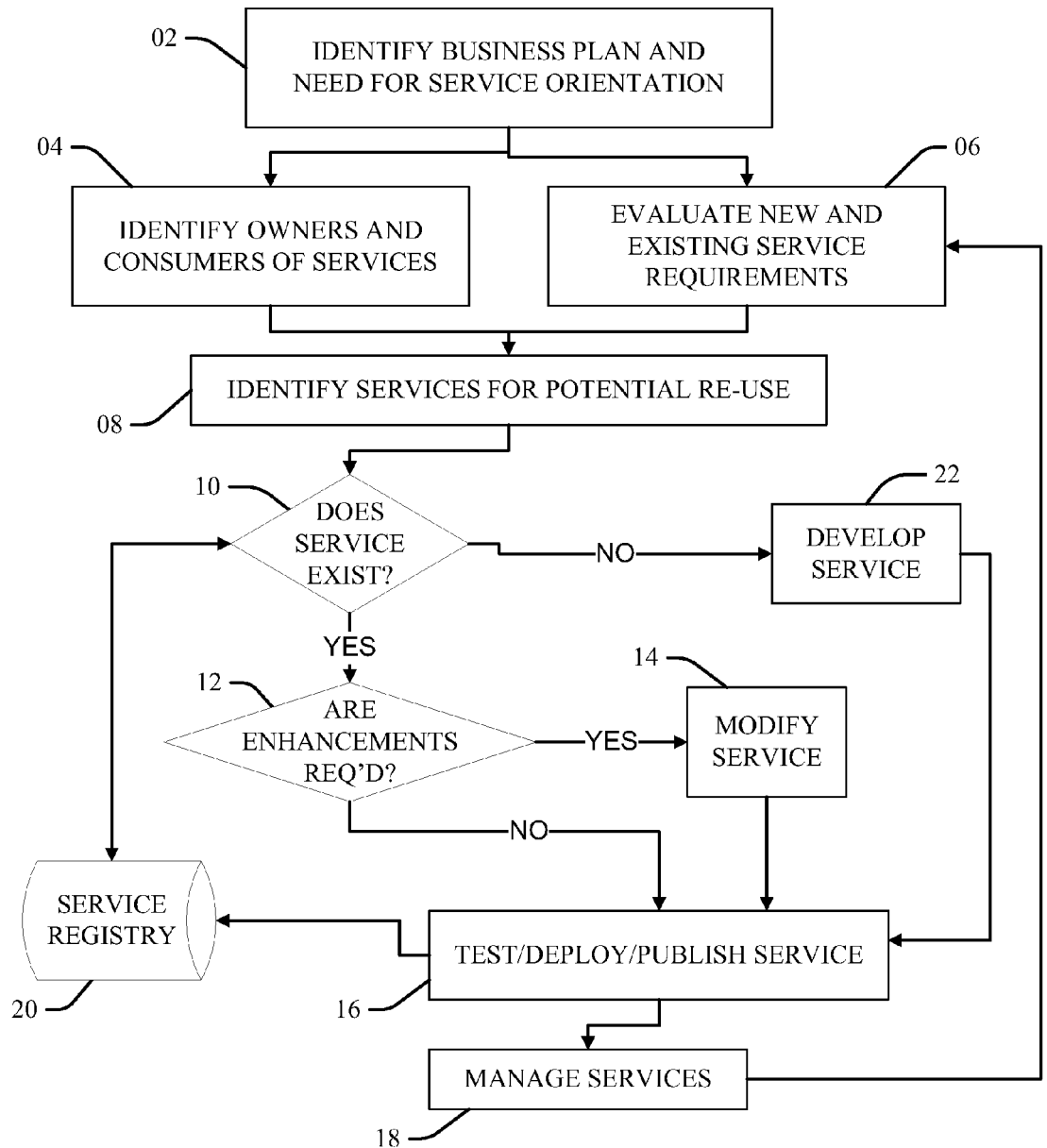
FIG. 1 is a flow chart illustrating creating and using shared services through service-oriented architecture governance and a services lifecycle process according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

Examples of SOA aspects and governance processes according to the present invention may be found in the following commonly-owned and co-pending U.S. patent applications or issued U.S. patents, the disclosures of which are expressly incorporated herein by reference: "Identifying a Service Oriented Architecture Shared Services Project", filed on Nov. 24, 2008, and assigned application Ser. No. 12/277,280; "Evaluating a Service Oriented Architecture Shared Services Project", filed on Feb. 19, 2009, and assigned application Ser. No. 12/388,533; "Selecting a Service Oriented Architecture Shared Service", filed on Feb. 24, 2009, and assigned application Ser. No. 12/391,426; "Service Oriented Architecture Shared Services Elaboration", filed on Feb. 24, 2009, and assigned application Ser. No. 12/391,728; "Service Oriented Architecture Shared Services Construction", filed on Feb. 25, 2009, and assigned application Ser. No. 12/392,189; "Transitioning to Management of a Service Oriented Architecture Shared Service", filed on Feb. 25, 2009, and assigned application Ser. No. 12/391,728; "Management of a Service Oriented Architecture Shared Service", filed on Feb. 26, 2009, and assigned application Ser. No. 12/393,110; "Service Oriented Architecture Shared Service Escalation", filed on Feb. 24, 2009, and was assigned application Ser. No. 12/391,362; "SOA POLICY VERSIONING", filed on Mar. 25, 2009, and assigned application Ser. No. 12/410,488; "FRAMEWORK FOR VARIATION ORIENTED ANALYSIS FOR SERVICE-ORIENTED ARCHITECTURE", filed on Mar. 25, 2009, and assigned application Ser. No. 12/410,491; "TECHNICAL FEASIBILITY EXPLORATION FOR SERVICE-ORIENTED ARCHITECTURE ENVIRONMENTS", filed on Mar. 25, 2009, and assigned application Ser. No. 12/410,493; "SOA Lifecycle Governance and Management", filed on Mar. 25, 2009, and assigned application Ser. No. 12/410,497; "CALIBRATION FRAMEWORK FOR EFFORT ESTIMATION", filed on Mar. 25, 2009, and assigned application Ser. No. 12/410,509; "SERVICE PORTFOLIO APPROACH FOR SOA GOVERNANCE", filed on Mar. 25, 2009, and assigned application Ser. No. 12/410,526; "SERVICE EVOLUTION APPROACH IN SOA", filed on Mar. 25, 2009, and assigned application Ser. No. 12/410,541; "CAPABILITY AND MATURITY-BASED SOA GOVERNANCE", filed on Mar. 25, 2009, and assigned application Ser. No. 12/410,554; "PRIORITIZATION ENABLEMENT FOR SOA GOVERNANCE", filed on Mar. 25, 2009, and assigned application Ser. No. 12/410,572; and "SOA POLICY ENGINE FRAMEWORK", filed on Mar. 25, 2009, and assigned application Ser. No. 12/410,592.

As organizations adopt SOA, there is a need to put in place an effective SOA governance process. Existing IT governance processes are not focused on sharing or deploying solutions across lines of business, rather, current IT governance processes are narrowly focused on the deployment of specific IT solutions. Additionally, existing governance processes are not concerned with the lifecycle of the solution; they are concerned with the initial deployment within a specific business area. In an SOA environment, the goal of an SOA governance process is to promote sharing of services across lines of business and the services lifecycle management is a critical element of the governance function to ensure that business processes don't break as updates or new versions of services are made available. Another problem faced by organizations is "how to get started with SOA governance". The present invention addresses the shortcomings of prior art IT governance processes and proposes a methodology for enabling an effective SOA governance process using a service lifecycle approach.

More particularly, prior art IT governance processes are not concerned with the sharing of IT solutions, how they would be managed in a shared use environment, or what policies are required when multiple business units are involved in the decision process affecting the IT solution that has been deployed. Additionally, a decision making authority generally needs to be selected, as well as defining a decision making process involving all the impacted business units. These drawbacks or shortcomings of current IT governance models must be faced if they are applied to an SOA environment.

As SOA capabilities proliferate in enterprises through the infusion of SOA governance it is desirable to drive changes from multiple different aspects. First, it is advantageous to introduce the notion of the lifecycle of services, or at a minimum to infuse services aspects into existing IT life-cycle management processes. Another aspect that drives the effective enablement of SOA governance is the adoption of the right service state transition model for an enterprise and associated appropriate stakeholders across dimensions depicting the collaborative aspects of governing and managing SOA. Enabling SOA governance using a multi-dimensional approach based on services lifecycle driven on a service state transition and cross-enterprise stakeholder view is a next generation approach needed in the industry, and will help in closing the gaps of proliferating governance capabilities, mechanisms that address organization culture and services specific aspects.

Current prior art methods focus on defining and enabling SOA governance models without the underpinning of the SOA or services lifecycle, one of the most significant aspects brought in by SOA. For example, IBM Corporation's "SOA Governance and Management Method" (SGMM) focuses on definition and enablement of SOA Governance using a traditional lifecycle (service strategy, design, transition and operation). Other models are based on establishing IT processes and do not address either business/organizational aspects, nor any Service State Transition-based governance and management.

SOA governance generally requires addressing a services lifecycle process which provides guidance for the creation and use of shared services. The services lifecycle process starts with identifying business needs for which there are potential service candidates, leading to service development, service implementation, service changes, and eventually service retirement. This process involves all these aspects to ensure that each affected business area is aware of the changes and can make use of the candidate services.

The present invention addresses shared services across business lines versus silo'ed governance methods, pulling together service providers, service consumers, and multiple stakeholders and building on a shared services lifecycle model. The present invention also extends to post-production deployment operations and SOA services management by identifying service provider, service consumer, multiple stakeholders and SOA services enablement teams or entities and defining activities that revolve around these distinct teams/entities, in one aspect addressing extensible and collaborative aspects of SOA lifecycle management. A collaborative style of lifecycle and activity definition also allows definition of control mechanisms such as governance checkpoints.

The present invention focuses on the core needs of SOA beyond individual project and program management aspects, and models address cross-program, enterprise-level collaborative entities. Focusing on service provider, service consumer and SOA enablement entities provides a clear and extensible approach to the collaborative aspects of SOA lifecycle management.

FIG. 1 is a high-level overview of a shared services lifecycle. At 02 a business plan is identified and a need for service orientation is determined. A business need for service may be identified via a variety of ways, illustrative but not exhaustive including regulatory changes, problem situations, organizational strategy changes, performance improvements and annual planning cycle, and still others may be apparent to one skilled in the art. After the business need is identified, candidate services are identified. In the present example at 04 potential service candidates (owners and consumers of services) are identified, and new and existing service requirements are evaluated at 06. In response to said candidate identification and service requirement evaluation, services are identified for potential reuse at 08.

The present invention also provides for a service discovery process. Thus, at 10 it is determined whether a service identified at 08 for potential re-use exists. If so, then at 12 it is determined whether any enhancements are required, and if so the service is modified at 14. The existing or modified-existing service is then tested, deployed and/or published at 16, and subsequently managed at 18, the management providing feedback to further evaluations of new and existing service requirements at 06. Publication of said existing or modified-existing service at 16 further causes updating of a service registry 20 used in the service discovery process at 10.

If instead a candidate service does not exist 10, then one will be developed at 22, the developed service tested, deployed and/or published at 16 and subsequently managed at 18, with feedback to further evaluations at 06 and updating of the service registry 20 as provided above.

A service lifecycle view provides a comprehensive view into stages of services inception through deployment and management, and further covers collaborative aspects by identifying the various stakeholders brought in by SOA (e.g. a service provider, a service consumer/project, an SOA enablement group, etc). Services lifecycle-based SOA governance according to the present invention with appropriate governance mechanisms and processes may be defined by overlaying a service state transition model 50 illustrated in FIG. 2

This service state transition model 50 covers ten distinct states or transitions 52-70, allowing a comprehensive definition of service lifecycle governance mechanisms and processes. A service is in the Planned state 52 when an upcoming project has been planned that includes SOA services, for example services that an enterprise service bus (ESB) has been designed to handle in terms of such factors as mediation and routing. By design, all SOA services are generally sharable or reusable. According to the present invention a new entry is created for each potential service, and each service is placed in the Planned state 52.

A service enters the Funded state 54 when a corresponding project containing a proposed SOA service has been funded and approved. A service enters the Modeled state 56 once high-level and detailed requirements needed for a SOA shared service to meet the overall business need have been determined: illustrative but not exhaustive examples include service protocols, data format, and other implementation details based on the business and nonfunctional requirements, and also include service metadata such as service protocol, endpoints, service dependencies, etc.

The Assembled state 58 indicates that a service has been assembled and is ready for certification and introduction into a test environment; when the service is introduced to the test environment the state is set to "assembled." Once a service is tested and ready to move into production, its present service state is changed to a Certified state 60: at this point a deployment team may deploy the service in production.

Deployed state 62: once a service is certified, it is deployed in the production environment. Service endpoints are updated to refer to the production Uniform Resource Locators (URLs.), service metadata is copied from a test instance to a production registry instance, and a state-based status is set to offline in a production instance, the state remaining certified in the test instance. When service components are deployed the state-based status of the service is set to online, and when the service is made available to service consumers the state is set to "deployed."

Will-Be-Disabled 64 is a holding state used to notify service consumers that a service will be disabled in the future so that they can find and use an alternate service prior to the actual service disablement; it is also possible to transition from Will-Be-Disabled 64 back to the Deployed state 62. In the Disabled state 66, a deployed SOA service is currently disabled and cannot be used by consumers; once the service is restored the state may be updated to Deployed 62 and the service can be used by consumers.

The Deprecated state 68 is a notification state used to notify service consumers that the service will be retired in the future. New consumers are not allowed to use services in this state. Existing consumers should prepare to use an alternate service because services in this state will ultimately be retired; it is also possible to transition from Deprecated 68 back to the Deployed state 62. Lastly, a service is placed in the Retired state 70 from the Deprecated 68 state once the SOA service has been retired and is no longer in use, though it will be understood that any of the other states 52-66 may also transition directly to the Retired state 70.

Figure 3:
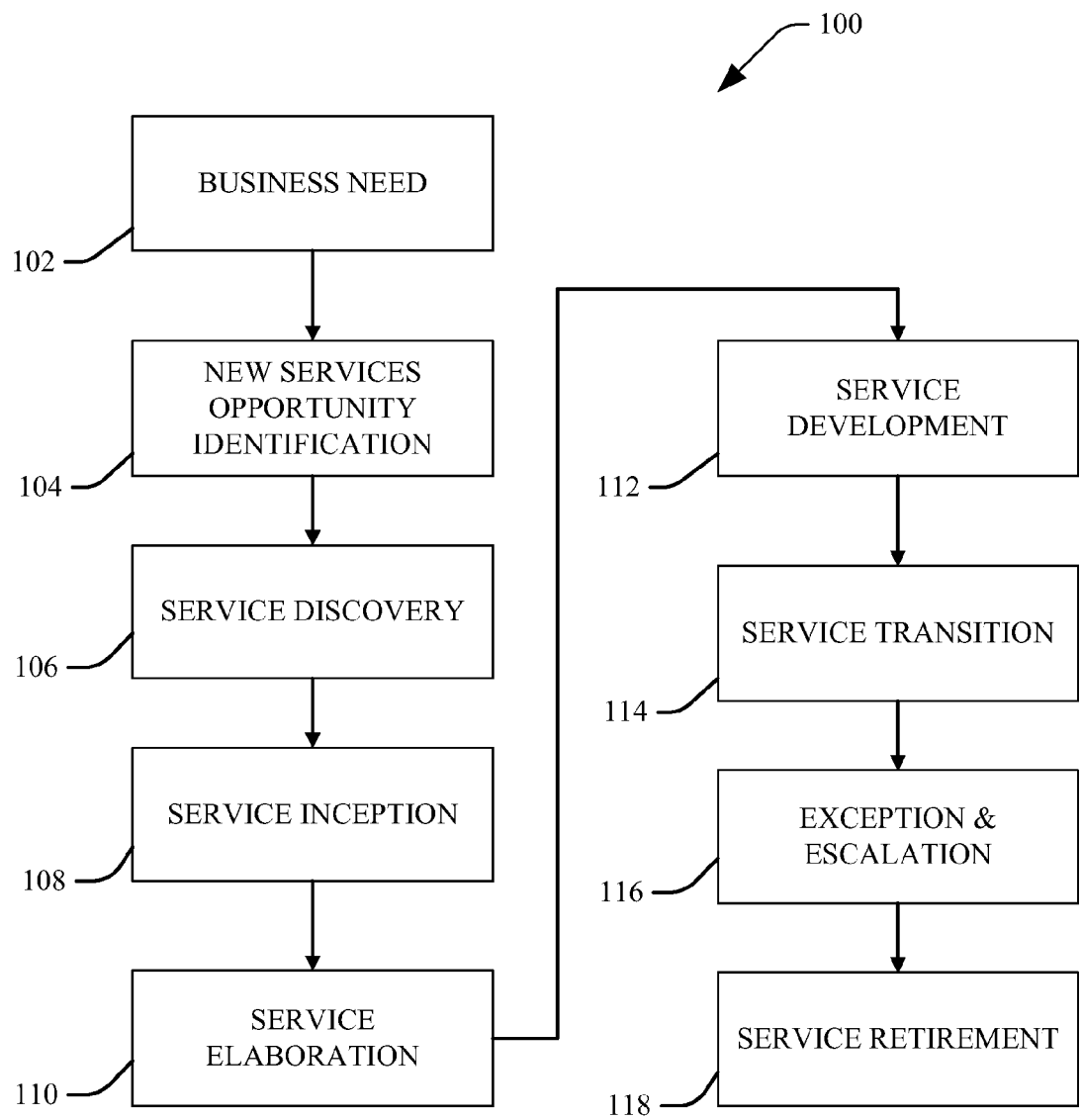
FIG. 3 is flow chart illustration of an SOA governance process using a service lifecycle approach according to the present invention.

Current and prior art IT governance processes generally comprise proposing an IT function for a specific business area; determining impacts to that business area; developing an IT solution plan; and implementing the IT solution. In contrast, FIG. 3 illustrates an SOA governance process 100 using a service lifecycle approach according to the present invention. At 102 a business need is provided, and at 104 a New Services Opportunity Identification process evaluates and determines if the business need can be satisfied via use of a shared service(s). At 106 a Service Discovery process reviews whether existing services can be utilized or whether a new service needs to be created. At 108 a Service Inception process defines high-level requirements for each of the shared services that will be developed or re-factored. High-level requirements may be gathered for SOA shared services that will be developed, for example as part of a potential ESB services candidate project wherein high-level requirements are developed for each potential ESB shared service. Also determined may be the extent to which existing services can be reused and which services must be created in order to meet an identified business need.

At 110 a Service Elaboration process refines high-level requirements from the Service Inception phase 108 into detailed requirements for construction needed to complete a service solution design and to take the necessary steps to prepare for the Service Development/Design phase 112. The Service Development phase 112 builds or re-factors a shared service according to the phase 110 requirements, and further considers using design principles to increase general use of the shared services, for example integrating ESB shared services components per design guidelines while meeting or exceeding the necessary quality requirements so that services may be deployed for general use.

The Service Transition phase 114 transfers the developed shared service to an operations team responsible for operations support and ongoing service maintenance; a service portfolio may also be updated with a developed new or re-factored service and its meta-data. The Exception and Escalation Process 116 resolves issues that occur during the services lifecycle process and may also update a service portfolio. Lastly, the Service Retirement phase 118 manages the retirement of a shared service.

Figure 2:
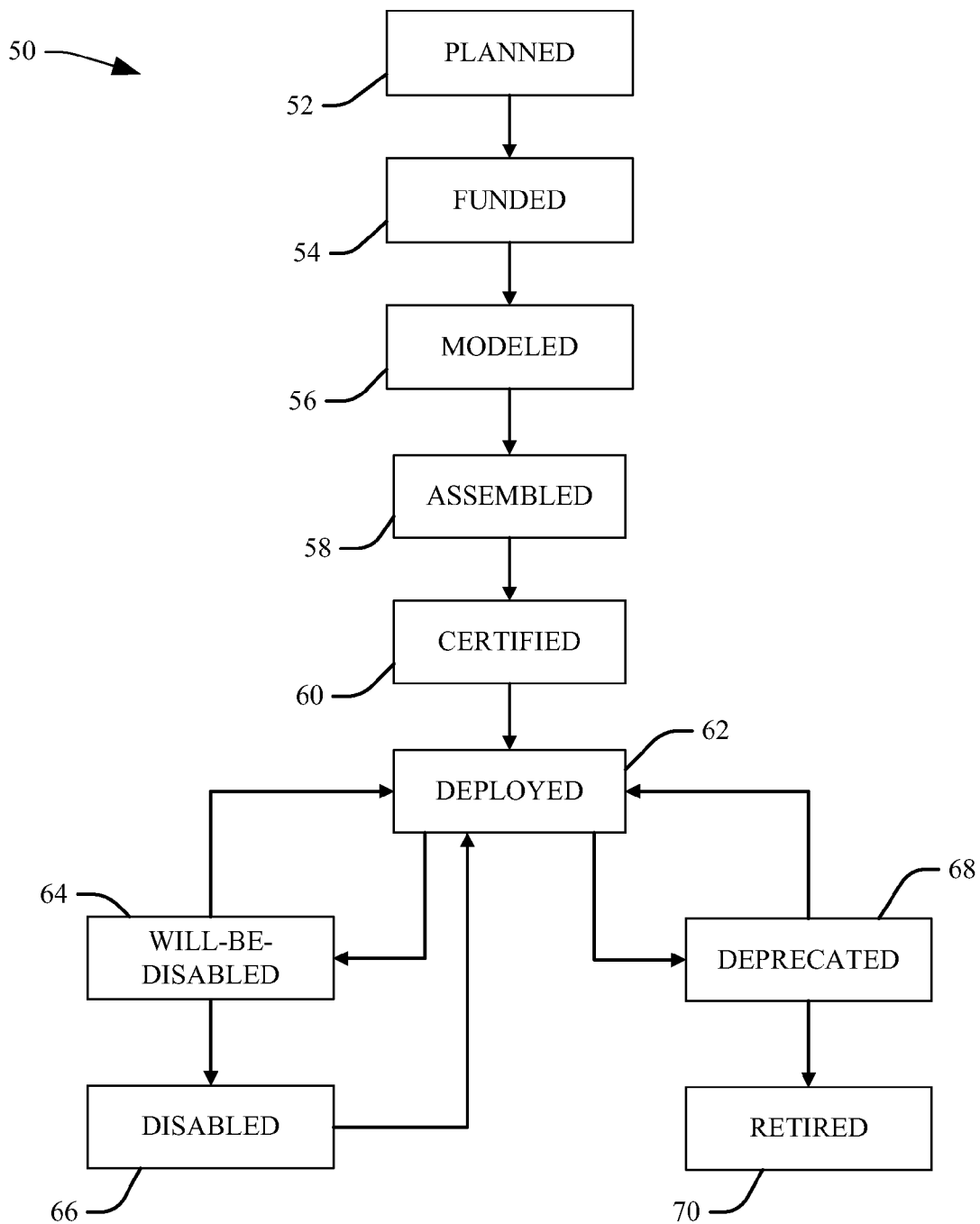
FIG. 2 is flow chart illustration of a service state transition model according to the present invention.
Figure 4:
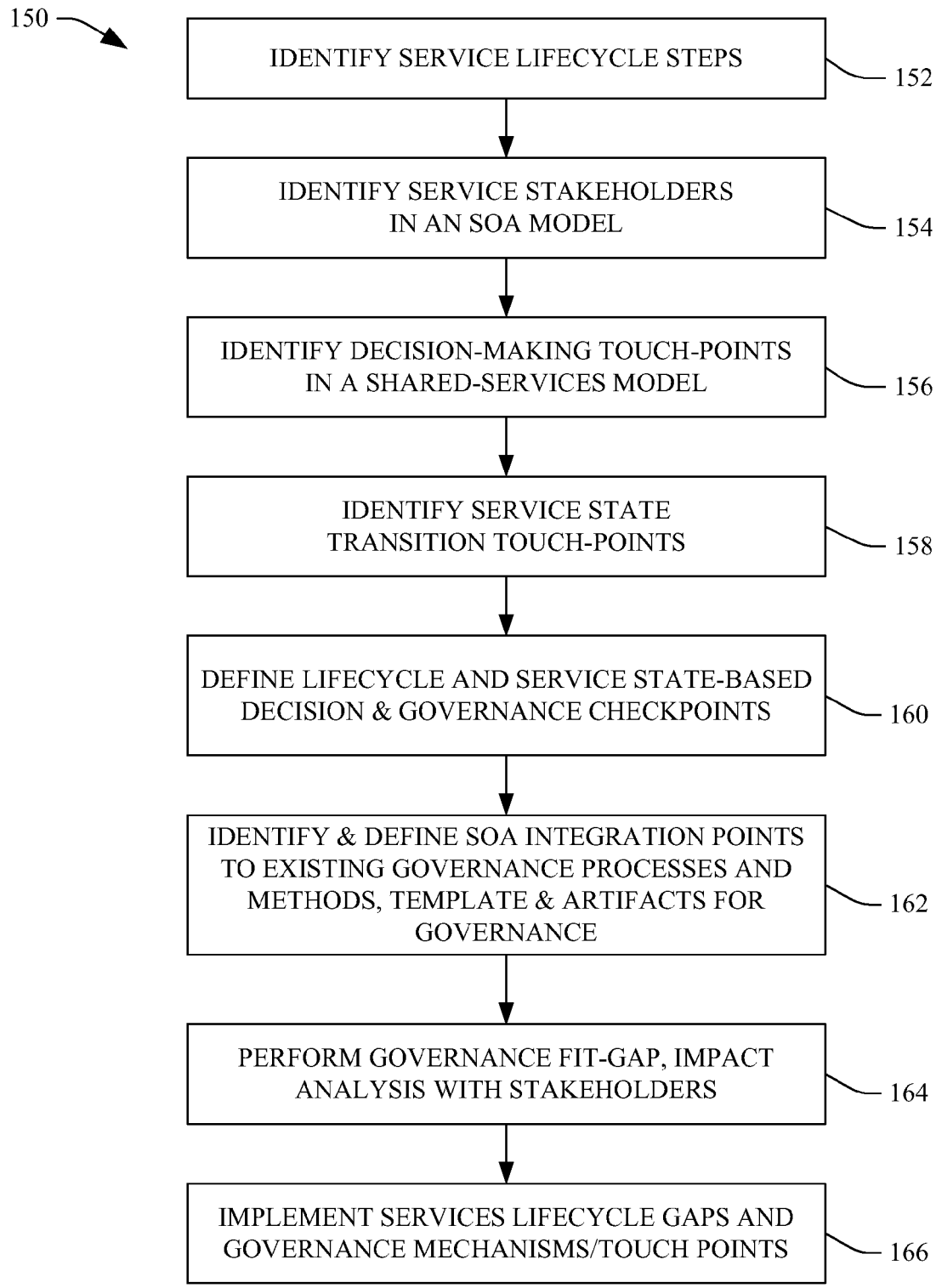
FIG. 4 is a flow chart illustrating a method or system for enabling SOA governance using a services-based lifecycle approach according to the present invention.

FIG. 4 depicts a method or system 150 for enabling SOA governance using a services-based lifecycle approach according to the present invention, in one aspect building on the capabilities illustrated in FIGS. 1-3 and discussed above. Thus, at 152 service lifecycle steps are identified, for example through the identifying process or processes 02, 04, 06 and/or 08 illustrated in FIG. 1 and described above. At 154 service stakeholders in an SOA model are identified, for example by identifying each of a plurality of lines of business, and each primary ownership and secondary ownership within each said line of business. At 156 decision-making touch-points in a shared services model are identified, for example through the query process or processes 10 and/or 12 illustrated in FIG. 1 and described above. At 158 service state transition touch-points are identified, for example through the identifying process 02 and/or the looping/iterative service discovery and developing processes 10-12-14-16-18-20-22 illustrated in FIG. 1 and described above.

As will be understood by general reference to the processes 02-04-06-08-10-12-14-16-18-20-22 illustrated in FIG. 1 and described above, at 160 lifecycle and service state-based decision & governance checkpoints are defined, at 162 integration points to existing governance processes and methods, template & artifacts for governance are identified & defined, and at 164 a governance fit-gap and/or impact analysis with stakeholders is performed. Lastly, services lifecycle gaps and governance mechanisms/touch-points are implemented at 166, for example through the query process or processes 10 and/or 12 illustrated in FIG. 1 and described above.

Figure 5:
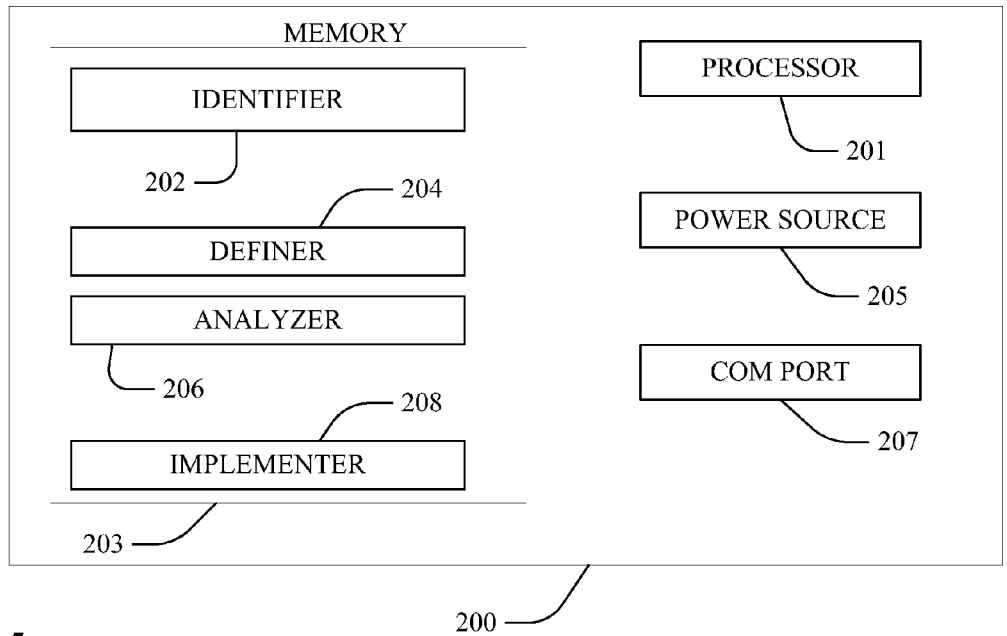
FIG. 5 is block diagram of a system or device configured to implement SOA governance using a services-based lifecycle approach according to the present invention.

FIG. 5 illustrates a programmable device or module 200 configured to implement SOA governance using a services-based lifecycle approach according to the present invention, for example as illustrated in FIGS. 1-4 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIGS. 1-4 as discussed above. Thus, the memory 203 comprises an Identifier logic component (e.g. algorithm, etc.) 202 configured to identify lifecycle steps, service stakeholders, decision-making touch-points, service state transition touch-points and integration points, for example as discussed above with respect to FIG. 4; a Definer logic component 204 configured to define lifecycle and service state-based decision & governance checkpoints and integration points, for example as discussed above with respect to FIG. 4; an Analyzer logic component 206 configured to perform a governance fit-gap analysis or an impact analysis with identified service stakeholders, for example as discussed above with respect to FIG. 4; and an Implementer logic component 208 configured to implement services lifecycle gap and governance touch-points, for example as discussed above with respect to FIG. 4. However, it will be understood that in other embodiments one or more of the logic components 202, 204, 206 and 208 may be omitted, and its functions or algorithms combined with others of the logic components 202, 204, 206 and 208 or accomplished by other systems, components, elements or parties.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 6:
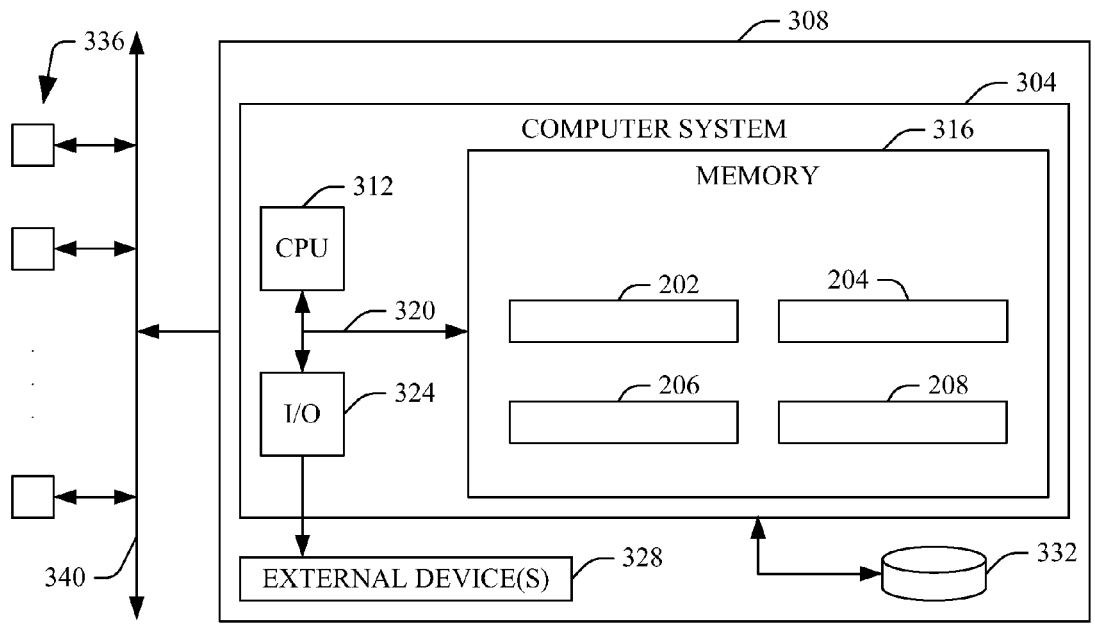
FIG. 6 is a block diagram illustrating a computerized implementation of a method or system for SOA governance using a services-based lifecycle approach according to the present invention.

Referring now to FIG. 6, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage systems 332. In general, the processing unit 312 executes computer program code, such as the code to implement various components of the process and systems, and devices as illustrated in FIGS. 1-5 and described above, including the Identifier logic component 202, the Definer 204, the Analyzer logic component 206 and the Implementer logic component 208, and which are stored in memory 316 and/or storage system 332. It is to be appreciated that two or more, including all, of these components may be implemented as a single component.

While executing computer program code, the processing unit 312 can read and/or write data to/from the memory 316, the storage system 332 (e.g. the, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 6 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for creating and using service-oriented architecture shared services, the method comprising:
    identifying via a processing unit a business need within a service-oriented architecture model;
    identifying via the processing unit a plurality of service-oriented architecture shared services within the service-oriented architecture model as candidates for satisfying the identified business need;
    identifying via the processing unit consumers and providers of the candidate services;
    identifying via the processing unit stakeholders in the identified candidate services by identifying each of a plurality of lines of business and each owner within each said line of business within the service-oriented architecture model;
    evaluating via the processing unit existing service requirements of the identified stakeholders, consumers and providers;
    determining via the processing unit if the business need can be satisfied via use of a service of the candidate services as a function of the evaluated existing service requirements of the identified stakeholders, consumers and providers; and
    if the determining indicates that the business need cannot be satisfied via use of a service of the candidate services:
    defining via the processing unit a high-level requirement for developing a new shared service;
    refining via the processing unit the high-level requirement into a detailed requirement for construction;
    building via the processing unit a new service of the plurality of shared services in a modeled state as a function of the high-level and detailed requirements;
    deploying the built new service in a certified state that is available to consumers of the plurality of shared services; and
    determining via the processing unit whether the new service available in the certified state will be at a future time disabled or retired;
    wherein, in response to the determination that the new service will be disabled at the future time, the processing unit places the new service in a will-be-disabled holding state that notifies the consumers that the new service will be disabled and that the consumers should find and use an alternate service of the plurality of shared services prior to the future disablement of the new service; and
    wherein, in response to the determination that the new service will be retired at the future time, the processing unit places the new service in a deprecated state that does not allow new consumers not already using the new service to use the new service, and that notifies existing consumers that are currently using the new service that the new service will be retired and that the existing consumers should prepare to use an alternate service of the plurality of shared services prior to the future retirement of the new service.

2. The method of claim 1, wherein said new service high-level and detailed requirements comprise a service protocol, a data format, service endpoints, service metadata and a service dependency.

3. The method of claim 2, further comprising:
    introducing the new service in the modeled state into a test environment in an assembled state that indicates that the new service has been assembled and is ready for certification; and
    changing the modeled state into the certified state in response to testing of the new service in the modeled state in the test environment indicating that new service is tested and ready to move into production.

4. The method of claim 3, wherein the step of deploying the built new service via the processing unit in the certified state available to consumers of the plurality of shared services further comprises:
    updating the service endpoints of the new service to refer to production uniform resource locators;
    copying the service metadata of the new service from a test instance to a production registry instance; and
    setting a state-based status of the new service to be deployed when the service is made available to the consumers.

5. The method of claim 4, wherein the processing unit further:
    restores the new service from the deprecated state back to the deployed state; and
    allows new consumers not already using the new service to use the new service when restored back to the deployed state.

6. The method of claim 5, further comprising:
    the processing unit placing the new service in the retired state from the deprecated state when the new service is retired and is no longer in use by the consumers.

7. A system, comprising:
    a processing unit in communication with a computer readable memory and a tangible computer-readable storage device;
    wherein the processing unit, when executing program instructions stored on the tangible computer-readable storage device via the computer readable memory:
    identifies a business need within a service-oriented architecture model;

identifies a plurality of service-oriented architecture shared services within the service-oriented architecture model as candidates for satisfying the identified business need;
identifies consumers and providers of the candidate services;
identifies stakeholders in the identified candidate services by identifying each of a plurality of lines of business and each owner within each said line of business within the service-oriented architecture model;
evaluates existing service requirements of the identified stakeholders, consumers and providers;
determines if the business need can be satisfied via use of a service of the candidate services as a function of the evaluated existing service requirements of the identified stakeholders, consumers and providers; and
if determined that the business need cannot be satisfied via use of a service of the candidate services:
defines a high-level requirement for developing a new shared service;
refines the high-level requirement into a detailed requirement for construction;
builds a new service of the plurality of shared services in a modeled state as a function of the high-level and detailed requirements;
deploys the built new service in a certified state that is available to consumers of the plurality of shared services;
determines whether the new service available in the certified state will be at a future time disabled or retired;
in response to the determination that the new service will be disabled at the future time, places the new service in a will-be-disabled holding state that notifies the consumers that the new service will be disabled and that the consumers should find and use an alternate service of the plurality of shared services prior to the future disablement of the new service; and
in response to the determination that the new service will be retired at the future time, places the new service in a deprecated state that does not allow new consumers not already using the new service to use the new service, and that notifies existing consumers that are currently using the new service that the new service will be retired and that the existing consumers should prepare to use an alternate service of the plurality of shared services prior to the future retirement of the new service.

8. The system of claim 7, wherein said new service high-level and detailed requirements comprise a service protocol, a data format, service endpoints, service metadata and a service dependency.

9. The system of claim 8, wherein the processing unit, when executing the program instructions stored on the computer-readable storage medium via the computer readable memory, further:
introduces the new service in the modeled state into a test environment in an assembled state that indicates that the new service has been assembled and is ready for certification; and
changes the modeled state into the certified state in response to testing of the new service in the modeled state in the test environment indicating that new service is tested and ready to move into production.

10. The system of claim 9, wherein the processing unit, when executing the program instructions stored on the computer-readable storage medium via the computer readable memory, further deploys the built new service in the certified state available to consumers of the plurality of shared services by:
updating the service endpoints of the new service to refer to production uniform resource locators;
copying the service metadata of the new service from a test instance to a production registry instance; and
setting a state-based status of the new service to be deployed when the service is made available to the consumers.

11. The system of claim 10, wherein the processing unit, when executing the program instructions stored on the computer-readable storage medium via the computer readable memory, further:
restores the new service from the deprecated state back to the deployed state; and
allows new consumers not already using the new service to use the new service when restored back to the deployed state.

12. The system of claim 8, wherein the processing unit, when executing the program instructions stored on the computer-readable storage medium via the computer readable memory, further:
places the new service in the retired state from the deprecated state when the new service is retired and is no longer in use by the consumers.

13. An article of manufacture, comprising:
a computer readable tangible storage device having computer readable program code embodied therewith, the computer readable program code comprising instructions that, when executed by a computer processing unit, cause the computer processing unit to:
identify a business need within a service-oriented architecture model;
identify a plurality of service-oriented architecture shared services within the service-oriented architecture model as candidates for satisfying the identified business need;
identify consumers and providers of the candidate services;
identify stakeholders in the identified candidate services by identifying each of a plurality of lines of business and each owner within each said line of business within the service-oriented architecture model;
evaluate existing service requirements of the identified stakeholders, consumers and providers;
determine if the business need can be satisfied via use of a service of the candidate services as a function of the evaluated existing service requirements of the identified stakeholders, consumers and providers; and
if determined that the business need cannot be satisfied via use of a service of the candidate services:
define a high-level requirement for developing a new shared service;
refine the high-level requirement into a detailed requirement for construction;
builds a new service of the plurality of shared services in a modeled state as a function of the high-level and detailed requirements;
deploy the built new service in a certified state that is available to consumers of the plurality of shared services;
determine whether the new service available in the certified state will be at a future time disabled or retired;
in response to the determination that the new service will be disabled at the future time, place the new service in a will-be-disabled holding state that notifies the consumers that the new service will be disabled and that the consumers should find and use an alternate service of the plurality of shared services prior to the future disablement of the new service; and in response to the determination that the new service will be retired at the future time, place the new service in a deprecated state that does not allow new consumers not already using the new service to use the new service, and that notifies existing consumers that are currently using the new service that the new service will be retired and that the existing consumers should prepare to use an alternate service of the plurality of shared services prior to the future retirement of the new service.

14. The article of manufacture of claim 13, wherein said new service high-level and detailed requirements comprise a service protocol, a data format, service endpoints, service metadata and a service dependency.

15. The article of manufacture of claim 14, wherein the computer readable program code instructions, when executed by the computer processing unit, further cause the computer processing unit to:
   introduce the new service in the modeled state into a test environment in an assembled state that indicates that the new service has been assembled and is ready for certification; and
   change the modeled state into the certified state in response to testing of the new service in the modeled state in the test environment indicating that new service is tested and ready to move into production.

16. The article of manufacture of claim 15, wherein the computer readable program code instructions, when executed by the computer processing unit, further cause the computer processing unit to deploy the built new service in the certified state available to consumers of the plurality of shared services by:
   updating the service endpoints of the new service to refer to production uniform resource locators;
   copying the service metadata of the new service from a test instance to a production registry instance; and
   setting a state-based status of the new service to be deployed when the service is made available to the consumers.

17. The article of manufacture of claim 16, wherein the computer readable program code instructions, when executed by the computer processing unit, further cause the computer processing unit to:
   restore the new service from the deprecated state back to the deployed state; and
   allow new consumers not already using the new service to use the new service when restored back to the deployed state.

18. The article of manufacture of claim 17, wherein the computer readable program code instructions, when executed by the computer processing unit, further cause the computer processing unit to:
   place the new service in the retired state from the deprecated state when the new service is retired and is no longer in use by the consumers.

* * * * *